(12) United States Patent
Ristock et al.

(10) Patent No.: US 8,351,594 B2
(45) Date of Patent: Jan. 8, 2013

(54) SYSTEM FOR INDICATING PRIORITY LEVELS FOR TRANSACTION AND TASK ENGAGEMENT IN A CALL CENTER

(75) Inventors: Herbert Ristock, Walnut Creek, CA (US); Vladimir Mezhibovsky, San Francisco, CA (US); Nikolay Korolev, Concord, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 250 days.

(21) Appl. No.: 12/702,044

(22) Filed: Feb. 8, 2010

(65) Prior Publication Data

US 2011/0194684 A1 Aug. 11, 2011

(51) Int. Cl.
*H04M 3/00* (2006.01)
(52) U.S. Cl. ......... 379/265.02; 379/265.09; 379/265.13; 379/266.02; 379/269; 379/201.02
(58) Field of Classification Search ............. 379/265.01–266.09; 370/351, 370/412
See application file for complete search history.

(56) References Cited

U.S. PATENT DOCUMENTS

| | | | |
|---|---|---|---|
| 6,937,880 B2 * | 8/2005 | Teranishi | 455/567 |
| 2002/0131399 A1 * | 9/2002 | Philonenko | 370/351 |
| 2004/0081183 A1 * | 4/2004 | Monza et al. | 370/412 |
| 2006/0209797 A1 * | 9/2006 | Anisimov et al. | 370/352 |
| 2006/0245578 A1 * | 11/2006 | Bienfait et al. | 379/265.02 |
| 2007/0041514 A1 * | 2/2007 | Rodkey et al. | 379/37 |
| 2007/0189480 A1 * | 8/2007 | Salafia et al. | 379/142.01 |
| 2008/0070522 A1 * | 3/2008 | Marriott et al. | 455/150.1 |
| 2008/0103800 A1 | 5/2008 | Domenikos et al. | |
| 2009/0055568 A1 | 2/2009 | Subramanian et al. | |

\* cited by examiner

*Primary Examiner* — Joseph J Nguyen
(74) *Attorney, Agent, or Firm* — Christie, Parker & Hale, LLP

(57) ABSTRACT

A call center system has a computerized server executing software (SW) from a machine-readable medium, a data collection function of the SW enabled for collecting data regarding incoming transactions, a data processing function coupled to the data collection engine and enabled for processing the data collected against a set of business rules, the data processing function determining a priority level for individual ones of the incoming transactions, and a distribution function enabled for distributing a priority indication determined by the data processing function to one or more presentation interfaces accessible to agents, at or near the time the associated transaction is engaged by the agent.

15 Claims, 6 Drawing Sheets

— 115

Agent Performance Summary
Morning Campaign 01/03/10  Welcome Tim  Sign Out → This Campaign met or exceeded CC Objectives
401       35 Agents worked this campaign ←

Agent 01-Smith, Jake  # of calls__  # of emails__  402
% of System Compliance__  Overall performance rating__
Agent 02-Smote, John  # of calls__  # of emails__
% of System Compliance__  Overall performance rating__
Agent 03-Route, Sandy  # of calls__  # of emails__
% of System Compliance__  Overall performance rating__

•
•
•
•
•
•

— 400

Agent 35-Zane, Guy  # of calls__  # of emails__
% of System Compliance__  Overall performance rating__

SYSTEM FOR INDICATING PRIORITY LEVELS FOR TRANSACTION AND TASK ENGAGEMENT IN A CALL CENTER

BACKGROUND OF THE INVENTION

1. Field of the Invention

The present invention is in the field of telephony including call center services and pertains particularly to methods and apparatus for prioritizing workflow and transaction handling to improve handling time and overall proficiency of the call center.

2. Discussion of the State of the Art

The present invention has particular application in call center technology, wherein voice calls, emails, text messages and other forms of communication events are received and routed to agents of the call center for conducting communication with the originators of the communication events. The term "call center" seems to imply that the communication events are all calls, but in state-of-the-art centers communication events of all sorts are handles, routed and engaged, including, but not limited to, voice calls, both connection-oriented and VoIP, text messaging, emails, chat sessions, and more.

In this specification, to be inclusive when referring to the multi-media communications in such a modern call center, the word "transaction" is used, and should be understood to include any and all sorts of communication interactions that may be managed, routed and engaged in the call center.

In the art of telephony, there are call centers that are contracted by different enterprises that function to service the customer base of the contracting enterprise. Some enterprises maintain their own in-house call center systems, but many enterprises contract out for such professional services.

A state-of-the-art call center may handle both analog and digital communications. Most call centers are enhanced using computer telephony integration (CTI). Many centers have direct Internet connection through a local network and practice Internet messaging and Voice over Internet protocol (VoIP). A call center typically employs a number of agents that are charged with the responsibility of handling call center business for the contracted enterprise. Agents may have varying skills and performance ratings. Agents may operate from personal computerized stations, each comprising a computer and an associated telephone or telephony application.

Contact centers (CC) often experience peaks in work load where too many transactions come in and not enough agents are available to handle them. The quality of customer service performed by agents degrades at those peak times or periods. Contact centers may also experience trough periods where there are insufficient transactions coming in to keep all of the agents busy. During these periods agents may miss the opportunity for further leveraging existing transactions by up selling or cross selling products to the callers.

Therefore, what is clearly needed is a system that improves call center efficiency in transaction handling and quality of the transaction experience for customers. A system such as this will tend to alleviate solve the problems cited above.

SUMMARY OF THE INVENTION

The problem stated above is that optimizing processing efficiency for call center workflow, including transaction handling is desirable for a call center, but many of the conventional means for such optimization fail to take into account agent proficiency levels and other field parameters that might be in effect at the time processing. The inventors therefore considered functional components of a call center system, looking for elements that exhibit interoperability that could potentially be harnessed to improve efficiency and lower cost but in a manner that would not create redundancy or unnecessary delays in routing.

Every call center relies on an influx of calls and messages, one by-product of which is an abundance of pending transactions waiting in queue during peak periods when call flow is much greater than agent availability. Most such call centers employ queuing and routing systems to manage the transactions from the perspective of the call center as best as is possible considering call center objectives and goals, some of which are contractual obligations.

The present inventor realized in an inventive moment that if, before the point of routing, transactions could be prioritized according to a level of importance of the potential outcome of transaction handling to the call center, significant reduction in transaction handling time might result. The inventor therefore constructed a unique call center system for indicating priority relative to workflow in realtime that allowed the call center to exert some passive, and in some instances active control over the amount of transaction handling time expended by call center agents through indication of different priority levels. A significant reduction in handling time results with no degradation of service objectives or quality of service.

Accordingly, in one embodiment of the present invention, a call center system is provided, comprising a computerized server executing software (SW) from a machine-readable medium, a data collection function of the SW enabled for collecting data regarding incoming transactions, a data processing function coupled to the data collection engine and enabled for processing the data collected against a set of business rules, the data processing function determining a priority level for individual ones of the incoming transactions, and a distribution function enabled for distributing a priority indication determined by the data processing function to one or more presentation interfaces accessible to agents, at or near the time the associated transaction is engaged by the agent.

In one embodiment of the system the priority indication is distributed to the associated agent before the transaction is engaged by the agent. Also in one embodiment priority levels are determined for call center tasks to which agents may be assigned or invited as well as for transactions, and wherein priority indicators for such tasks are distributed to associated agents at or near the time that the agents are assigned or invited to engage in the tasks. The tasks may include one or more of text message processing, email processing, order processing, chat hosting and participation in prepared campaigns.

In some embodiments the data collection engine collects information regarding selected agents as well as regarding transactions, and the agent information is used along with the transaction information in determining priority levels for transactions. Also in some embodiments the data collection engine collects information regarding selected agents and tasks as well as regarding transactions, and the agent and task information is used along with the transaction information in determining priority levels for transactions. In some cases the information relevant to each agent includes skills information regarding the agent. The information may include workload projection data relevant to each agent as well.

In particular embodiments of the invention the priority indication comprises a display indicating priority level by color, and in some cases the priority indication further comprises one or more specific suggestions formulated by the system and related to the priority indication, to guide the agent that engages an associated transaction.

In another aspect of the invention a method for call center management is provided, comprising the steps of (a) collecting data regarding incoming transactions by executing software (SW) from a machine-readable medium by a computerized server; (b) processing the data collected against a set of business rules by a data processing function, determining a priority level for individual ones of the incoming transactions; and (c) distributing a priority indication determined by processing the data to one or more presentation interfaces accessible to agents, at or near the time the associated transaction is engaged by the agent.

In one embodiment of the method the priority indication is distributed to the associated agent before the transaction is engaged by the agent. Also in one embodiment priority levels are determined for call center tasks to which agents may be assigned or invited as well as for transactions, and wherein priority indicators for such tasks are distributed to associated agents at or near the time that the agents are assigned or invited to engage in the tasks. The tasks may include one or more of text message processing, email processing, order processing, chat hosting and participation in prepared campaigns.

In some embodiments of the method the data collection engine collects information regarding selected agents as well as regarding transactions, and the agent information is used along with the transaction information in determining priority levels for transactions. Also in some embodiments the data collection engine collects information regarding selected agents and tasks as well as regarding transactions, and the agent and task information is used along with the transaction information in determining priority levels for transactions. The information relevant to each agent may include skills information regarding the agent. In some cases the information includes workload projection data relevant to each agent.

In some embodiments of the method the priority indication comprises a display indicating priority level by color, and may further comprise one or more specific suggestions formulated by the system and related to the priority indication, to guide the agent that engages an associated transaction.

BRIEF DESCRIPTION OF THE DRAWING FIGURES

FIG. 4 is an exemplary screen shot of the priority indication interface of FIG. 1 for a supervisor.

DETAILED DESCRIPTION

The inventors provide a unique system for managing transactions in a manner that enables reduction of transaction handling time in a call center. The methods and apparatus of the present invention are described in enabling detail using the following examples, some of which may represent more than one embodiment.

Figure 1:
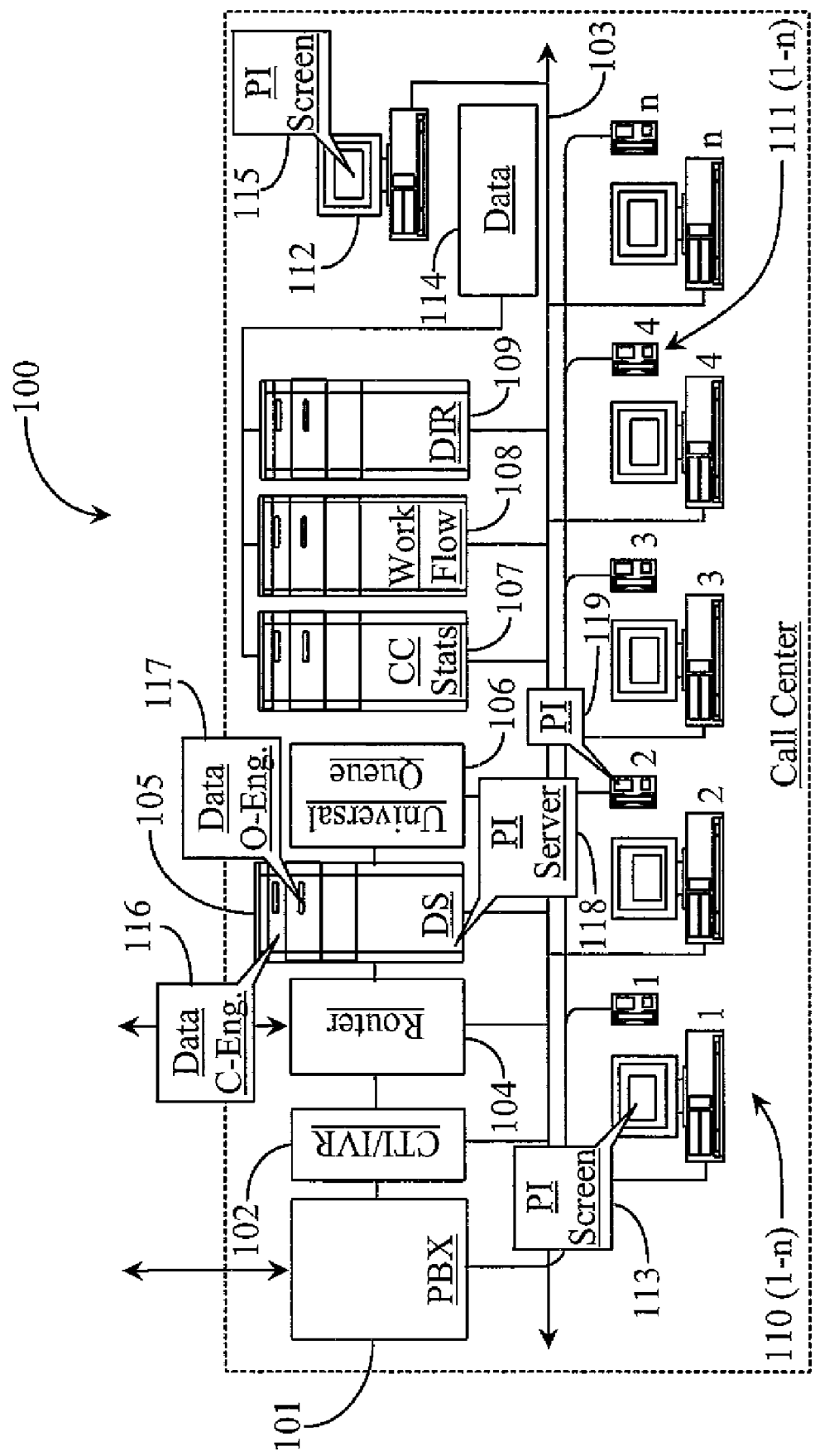
FIG. 1 is an architectural overview of a call center 100 featuring prioritized workflow according to an embodiment of the present invention.

FIG. 1 is an architectural overview of a call center (CC) 100 featuring prioritized workflow according to an embodiment of the present invention. Call center 100 in this example is adapted to process telephony transactions including processing of data network telephony (DNT) and more particularly Internet protocol network telephony (IPNT), a subset of DNT.

CC 100 includes a local area network (LAN) 103. LAN 103 is adapted with Internet protocols such as transfer control protocol/Internet protocol (TCP/IP) and other transport and communications protocols required enabling Internet-based network telephony and messaging. LAN 103 may be an Ethernet network, a small office/home office (SoHo) network, or a wireless LAN without departing from the spirit and scope of the present invention. LAN 103 may comprise any existing network technology and architecture that supports communication and Internet access.

CC 100 in this embodiment includes a central telephony switch 101, which in this example, is a private branch exchange (PBX) switch. PBX 101 may instead be an automated call distributor (ACD) or some other existing switching facility. PBX 101 may be a hardware switch or a switch implemented in software (SW). PBX 101 is hosted on LAN 103 and resides within the physical domain of CC 100 although this is not required to practice the present invention. PBX 101 may be a network-based hardware switch or soft switch that is controlled by a third-party telephony service provider (TSP).

PBX 100 accepts incoming telephony transactions from the external network, which may be a public switched telephone network (PSTN) or the Internet network depending upon the nature of the switching facility. PBX 101 is computer telephony integrated (CTI) using a CTI processor 102 running an instance of interactive voice response (IVR). CTI/IVR 102 is connected to PBX 101 via a CTI link. CTI/IVR 102 is directly connected to LAN 103.

LAN 103 supports a number of agent communications stations comprising a number of computer appliances 110 (1-n) and a like number of agent telephones 111 (1-n). Telephones 111 (1-n) are connected to PBX 101 by way of separate PBX lines 120. PBX 101 may also have direct LAN connection without departing from the spirit and scope of the present invention. Computer appliances may be personal computers (PCs), Laptop computers, or any other computing appliance having connection to LAN 103 that has input and display capabilities.

LAN 103 supports a router 104. Router 104 is a logical representation of an transaction router and may also function as an edge router for data entering the CC from the Internet or other digital networks. Router 103 has connection to the Internet network not illustrated and provides a last hop for Internet-sourced telephony and messaging before final routing within CC 100.

LAN 103 supports a queue 106, termed a universal queue because it may represent all queued transactions of any supported media type. Queue 106 has a direct connection to LAN 103. Queue 106 may be adapted to queue telephony voice transactions and text-based transactions such as email, for example. Queue 106 includes a digital medium (not illustrated) adapted to store all of the SW and data required to enable function as a queuing system where calls and messages subject to internal routing are queued when no agents are immediately available to take transactions.

LAN 103 supports various servers including a statistics server (CC Stats) 107 for serving CC statistics. CC stats 107 has a digital medium provided therein or coupled thereto that contains all of the data and SW required to enable server function as a call center statistics server. Stats server 107 may be subscribed to by human operators or by system processes. CC stats may include details and parameters of ongoing telephony operations such as average handling time (AHT) for an agent to handle an transaction. Another statistic for the CC may be the estimated wait time (EWT) for transactions in queue before picked up by or routed to (internal routing) a CC agent. Other statistics may relate to agent performance such as number of calls handled during campaign, success rate of sales calls for a campaign, etc.

LAN 103 supports a workflow server 108 for serving CC workflow to agents logged into the CC system. Workflow server 108 has a digital medium provided therein or coupled thereto that contains all of the data and SW required to enable server function as a workflow server. Server 108 is adapted to serve workflow assignments to in-house and remote CC agents. Assignments to an agent may include expected load of future telephone transactions and email transactions, as well as other projected duties that the agent is expected to perform within a specified work period.

LAN 103 supports a directory (DIR) server 109. DIR server 109 has a digital medium provided therein or coupled thereto that contains all of the data and SW required to enable server function as a directory server. DIR 109 is adapted to serve any information about persons working for the CC and may include name, title, extension, email, specialized skills, basic skills level, station number, and current work status of those individuals including shift information, schedule information, and so on.

A mass data repository 114 is illustrated in this example and is logically shared in this example by servers 107, 108, and 109. Repository 114 may hold any data relevant to any of the connected servers. In this case, the servers share repository 114 in a logical representation. In actual practice each server may have its own data repository. Sharing is illustrated herein only to avoid redundancy in illustration and should not be viewed as a limitation of the spirit or scope of the present invention.

A computing appliance 112 is illustrated in this example and has direct connection to LAN 103. Appliance 112 is adapted as a supervisor station, which enables an agent supervisor in charge of one or more CC agents to monitor agent performance and to make suggestions to agents about how they might improve their performance, among perhaps other functions.

In one embodiment of the invention, a data server (DS) 105 is provided and is connected to LAN 103. DS 105 has a digital medium included therein or coupled thereto that contains all of the data and SW required to enable function as a data server. DS 105 is both a data processing system and a data server capable of serving information to any person or machine having connection to LAN 103. In this example, DS 105, queue 106, router 104, CTI/IVR 102, and PBX 101 are interconnected by a separate data network for networking convenience. For example, cross communications between those machines may be directed over the separate network and therefore kept off of LAN 103 providing better LAN communication.

Data server 105 has a data collection engine (DCE) 116 application provided thereon and executable there from. DCE 116 is adapted according to one embodiment of the present invention for collecting and aggregating data from various sources having access to LAN 103, such as from Stat server 107, workflow server 108, and directory server 109. Data that is collected by server 105 may be stored in a data repository (not illustrated) coupled to the server.

DCE 116 gathers data for the purpose of processing gathered data against a set of business rules in order to determine various priority levels for agent current and projected task transaction within the call center during a specified work period or periods. A data optimization engine (DOE) 117 is provided to reside on server 105 and is adapted to receive raw data from DCE 116 for processing. DCE 116 takes raw data and processes that data against one or more business rules in order to produce system priority indications for workflow categories, priority indications for agent participation in current and in projected CC tasks, and priority indications for handling individual CC transactions.

DS 105 also includes a priority indication (PI) server 118. PI server 118 is an information distribution mechanism that delivers current priority indicators to appropriate end destinations in embodiments of the invention. A priority indication is information stating a priority level for agent engagement in completing a task, engaging in work in a particular category of workflow or engagement in an individual transaction. In this example end destinations may be thought of as transaction interfaces.

A transaction interface might be a screen or window in a telephony application running on a computer. A transaction interface might also be an information screen running on a display of a telephony communication device such as a PBX telephone. A transaction interface might also be a screen or window residing in an agent or supervisor desktop application used for practicing telephony and CC management operations. In this example a priority indication screen 113 is illustrated on computing appliance 110 (1). Such a screen or window may be that of a telephony application used for practicing telephony. Priority indication screen might be resident in an email application interface where each email requiring response includes a priority indication for that agent to engage the customer by responding to the email message. In another embodiment, PI screen 113 may reside in a chat interface where the indication is the level of priority for the agent to engage the customer in a chat conversation. In another embodiment PI screen 113 may reside in a telephone application or an agent desktop application adapted for telephony voice communications.

According to an embodiment of the present invention, the CC system is enabled by SW applications DCE 116, DOE 117, and PI server 118, to present priority indications to CC agents, CC agent supervisors, and CC agents operating as knowledge workers (KW), the indicators being served in real time. A priority indication served in real time to a CC agent might be, for example, a priority level for that agent to engage in a specific transaction of the type voice, message, or chat waiting in queue for the agent. This type of granularity may be afforded from transaction to transaction, and covers all types of live one-on-one transactions between customers of the call center and agents working for the center. An agent may work within center 100 and be connected directly to LAN 103 such as an agent operating computer appliance 110 (1) and telephone 111 (1). An agent may also reside externally from the call center, such agents known as remote agents, connected to LAN 103 indirectly through the Internet network or some other network as a carrier network.

Another priority indication that might be served by the CC system is a priority indication for a particular agent to engage in some particular future or scheduled category of workflow such as email processing for example. Information about each agent and transaction is considered separately when formulating a priority indication for engagement for individual transactions waiting in queue for agents.

In practice of the present invention for voice telephony, as transactions incoming to CC 100 arrive at PBX 101 for internal routing, they are queued in queue 106 when agents are not available to take calls. Each call is typically evaluated by IVR, and the IVR raw data is collected by DCE 116. DCE 116 passes the information about each queued transaction to DOE 117. DOE 117 runs the data against one or more business rules and creates a priority level for each transaction and may also formulate a system suggestion for the agent handling the call. The system suggestion is relevant to the priority level and may be a tip for the agent about how to proceed more carefully or more expediently depending on the indicated priority for that transaction. Priority level set for a transaction may also be adjusted somewhat by information known about the agent.

If two agents with different skills levels are available to accept a call, that call may have a visible indication of priority from the perspective of one agent that is higher than a visible indication of priority served to the other agent. In other words the agent having the higher skills level is preferred by the system to answer the call over the agent having lower skills. PI 119 is illustrated as resident on PBX 111 (2). PI 119 may light up every time a call is routed to the PBX device. In one embodiment the PI screen might contain a three-level visual indicator such as a color bar having three different color options, for example red (highest priority level), yellow (next lower), and green (lowest priority level). One of the three colors may light up or may otherwise be caused to standout from the other options in some way to serve indication of one of the three level options. In one embodiment a PI color bar may be presented with multiple shading options for intensity of the current priority indication. For example a high priority red may include two or more shades of red indicating a level of priority within the priority.

PI screen 115 may contain information about one or more agents and their ongoing interactivity with the priority order-based system. For example, a supervisor may see system suggestions and original priority levels for the transactions engaged in by that agent. The supervisor might compare the agent's actual engagement responses with what the system suggestions were for each transaction viewed to determine how compliant that agent has been with following system suggestions at each point of engagement. In one embodiment, the invention is practiced using session initiation protocol (SIP)-based PBX switching.

Figure 2:
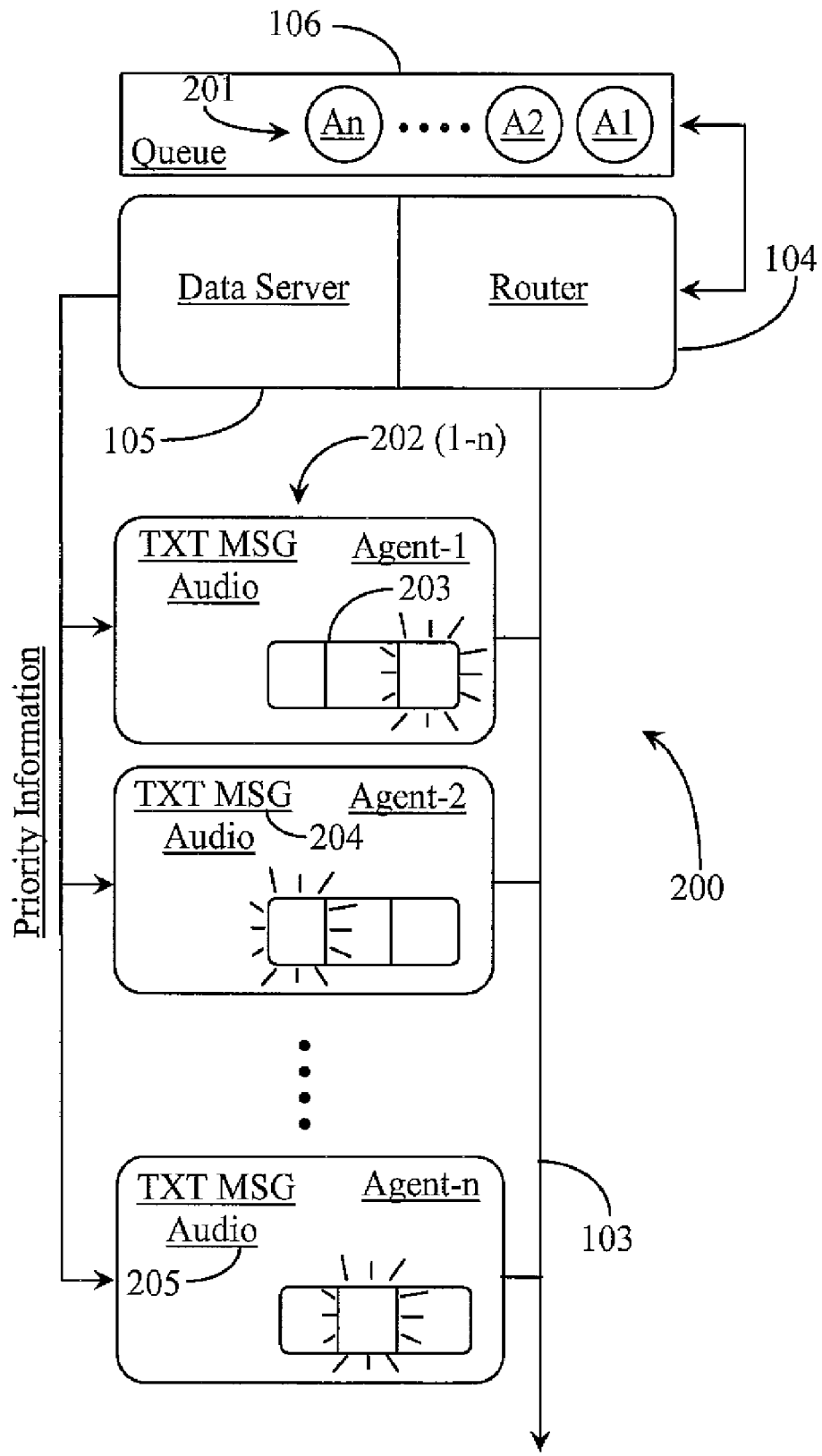
FIG. 2 is a block diagram illustrating agent pre-notification of transaction priority and system suggestions according to an embodiment of the present invention.

FIG. 2 is a block diagram 200 illustrating agent pre-notification of transaction priority and system suggestions according to an embodiment of the present invention. Diagram 200 includes representation of queue 106 of FIG. 1. Queue 106 contains queue entries 201 encompassing transactions for agent-1, agent-2, and agent-n. In this example queue 106 is a FIFO queue and the next transaction to be routed to an agent is to be routed to the transaction interface 202 (1) or agent-1. Transaction A2 is to be routed to transaction interface 202 (2) or agent-2. Transaction An is to be routed to the transaction interface 202 (n) or agent-n. Other agents working queue 106 are currently busy handling calls and are not visible until they are available to accept a next transaction. Router 104 routes A1 to agent-1 but not before serving agent-1, with the aid of data server 105, a visual indication 203 of the priority level that the system considers appropriate for agent-1 to handle the transaction A1. In one embodiment all incoming transactions for agent group 202 (1-n) are rated for priority according to IVR information and other information known about each transaction and each agent. In this case the priority levels indicated are illustrated as a graphical color bar 203 appearing before each agent just before each transaction is routed. So in this example, each transaction is rated hot, medium, or mild with hot=the highest priority and mild=the lowest priority. In one embodiment the priority indication and system suggestion for a transaction is served along with the relevant data about the customer and the nature of the transaction that the agent typically receives perhaps just seconds before the actual transaction arrives at the agent's transaction interface.

Transaction A1 of queued transactions 201 is system-ranked as the lowest of the three priority levels. A text message (204) or audio message (205) may be generated and sent to agents along with priority indications before calls actually arrive at their stations. The additional information may be a system suggestion delivered in text and/or audio file that gives the agent a tip for handling the call according to the lowest priority. The tip may be a limit on the time that the agent should devote to handling the transaction before terminating the transaction. The lowest priority then would have the lowest allowable transaction time associated with it.

Transaction A2 of queued transactions 201 is routed to the transaction interface agent-2 and has a priority indication of hot, or the highest priority level. The system audio or text message suggestion 204 served with the priority indication may be to allow sufficient transaction time to ensure a successful sale with more focus due to the intent of the caller to purchase a product or service. Queued transaction 201 An is routed to transaction interface agent-n. The priority indication is medium so the system allows more time to handle the transaction, perhaps to try and get the sale by phone.

In one embodiment a pool of agents may contain agents of varying skill levels and stages of training, and perhaps other differences as well. Therefore the priority indication for handling a transaction served to an agent may partially hinge on that agent's skill level for handling transactions of the type, with skill being taken as a broad concept; to include such things as hardware and software available to the agent, for example. Consider a queuing embodiment where agents are invited to handle queued transactions, rather than being automatically connected, and the agent is allowed to accept or decline the invitation. In this case, an automated invitation system might pace invitations to agents who are asked if they can accept a call. When the agent accepts the invitation, a transaction is routed to that agent.

In this scenario, the CC system may rank agents for handling a specific transaction type according to the levels of skill possessed by the agents. For example, for one transaction, two agents might be invited to engage where one agent has a priority indication of high while the other has a priority indication of low. The agent with the high priority indication may simply be the agent of the two with a higher skill set. Thus, the agent with the lower priority indication has the lower skill level for handling the specific type of transaction. Priority indications for transaction handling by agents can take into account multiple variables. In one embodiment the system may consider an transaction a high priority if an agent with sufficient skill handles it but a low priority if an agent having lower skills must handle it. Transactions may be individually prioritized in queue before routing. Transactions may be prioritized automatically by transaction type determined by IVR transaction before routing.

In another embodiment transactions might not carry their own ranking, but agents handling the transactions may be ranked according to the system priority for recruiting those agents to handle the incoming transactions. For example, an outbound calling campaign might require agents of a certain skill level and training to work incoming calls resulting from proactive outbound contact. The system might advertise the upcoming campaign and solicit agents to engage by sending invitations containing priority indications for particular agents to join the campaign. For example, an agent with marginal skill and a recent history of becoming angry at customers might receive a lower priority indication for joining the campaign than an agent with better skills and a great attitude for customer service. A system suggestion to a lower priority agent might be that "if you have email and incoming traffic, then please do not join the campaign". Another agent might receive an invitation that carries the highest priority and the system may simply inform the agent that we need you on this campaign and you should suspend all other CC activities for that period of time.

In this example, data server 105 serves priority indications and system suggestions (priority information) over one data network while the actual transactions are routed over LAN 103. This is simply a logical representation only. All of the data may be served over LAN 103 or a separate data network may be set up to serve notifications and priority indications. It is important to note that it is preferred that the priority information arrives at the transaction interface before the call with which it is associated. The present invention is illustrated and described with respect to voice transactions, but may be practiced with email, and chat sessions as well. In one embodiment transactions of different types are mixed in a same queue where priority indications and system suggestions are served relative to those particular transactions.

In the multimedia queue case an agent may have an interface for voice transactions, an interface for chat transactions, and an interface for answering email all open on the desktop. A priority indication will appear in one or more or all three interfaces and the agent may select which transaction to engage by looking at the priority indications in all of the interfaces. The transaction type having the highest priority will be answered first followed by the next priority transaction and the next lower priority indication. There are many possibilities.

Figure 3:
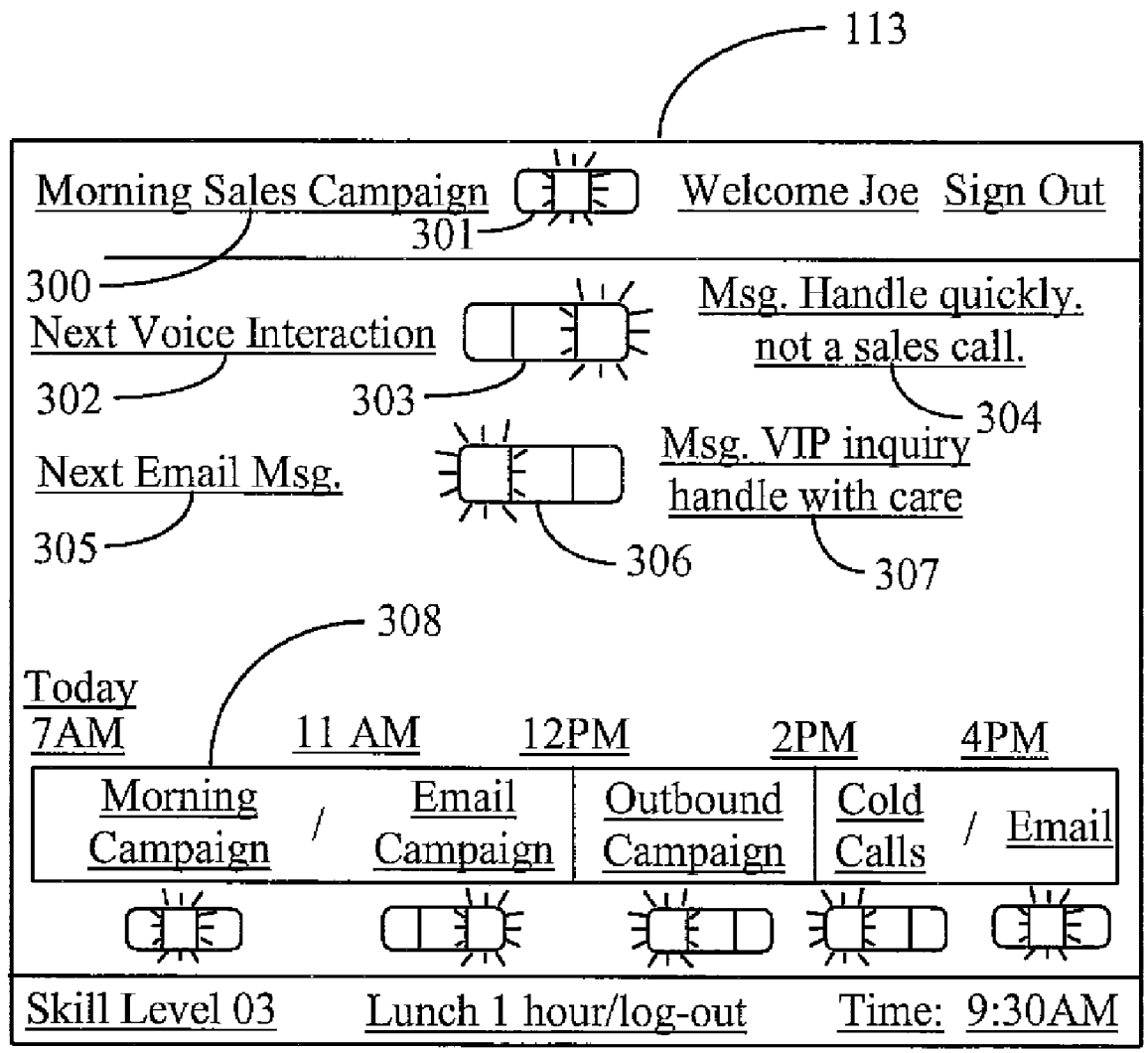
FIG. 3 is an exemplary screen shot of the priority indication interface of FIG. 1 for an agent.

FIG. 3 is an exemplary screen shot of priority indication interface screen 113 of FIG. 1 for an agent. Priority interface 113 is, in one embodiment, a universal interface that an agent may have open on the desktop while online and working. Interface 113 includes a welcome message and a sign-out option presuming that the agent is currently signed in. Interface 113 presents the current time as 9:30 AM. The interface identifies the current skill level of agent Joe, as skill level 03. The interface informs agent Joe of the fact that lunch may be taken up to one hour and the agent must log out of the system to take lunch. The interface does not specify when the agent should take lunch or what he should eat.

A projected workload bar 308 is provided within interface 113 that shows agent Joe what the days projected workload looks like and states the system priority levels associated with his engagement of the workload. Bar 308 begins at 7 AM and projects a morning sales campaign combined with an email campaign for agent Joe. The system priority for Joe to work each category is medium for the sales campaign, which is a voice campaign in this example, and mild for answering email during the email campaign. So from 7 AM to 12 PM Joe will have a greater priority to answer the phone over answering email. Joe may get an invitation to do something else that might carry a greater priority than the highest priority activity currently displayed between 7 AM and 12 noon. For example, an invitation for Joe to work the chat room might appear in the projected workload bar, say from 11:30 AM to 12:00 PM with a priority indication of hot meaning that it is more important to the CC that Joe work chat transactions over phone and email transactions for that period of time.

During the morning campaign 300 listed at the top as the current activity, each transaction that is routed to Joe also has a priority indication for transaction handling. For example, a next voice transaction queued for Joe has a priority indication 303 of mild. A system prompt 304 informs that the voice call is not a sales call so handle the call quickly using as little resource as possible. The next email message 305 for Joe to handle comes with a priority indication 306 of hot. The accompanying prompt 307 informs Joe that the message is from a VIP and to handle with much care.

An outbound campaign is listed in projected workload bar 308 scheduled from 12:00 PM to 2:00 PM. The campaign has a priority indication of hot meaning that the CC absolutely needs Joe on this campaign. The workload bar 308 lists the task of making cold calls beginning at 2:00 PM as a high priority for Joe to engage in along with the medium priority indication of answering email during the outbound campaign from 2:00 PM to 4:00 PM. According to the CC it is most important that Joe participate in the outbound campaign more than answering emails, but the priority of answering emails is higher than it was during the morning campaign. The information in the projected work bar may change during the day as activities are planned or Joe is reassigned to new activities. Field parameters of the call center environment may include variables such as time of day, overall call loads, peak or wane periods, unusual traffic loads that that escaped prediction, availability of certain agents or certain numbers of agents, load coming in from the Website, etc. Field parameters might affect system priority indications for agent engagement of certain workload categories.

It is noted herein that the system does not inform Joe when he should take his lunch. However, if Joe looks at the priority indicators lined up for the work period he can see that the best time for Joe to take a lunch will be sometime before 12:00 PM when the priority indicators are less than maximum for Joes engagement in the days workload. The system might expect Joe to take the proper slot for lunch and may receive feedback as to whether Joe took a slot that was opportunistic relative to the current or projected workload.

FIG. 4 is an exemplary screen shot of the priority indication interface 115 of FIG. 1 for a supervisor. In one embodiment of the present invention, interface 115 is presented to an agent supervisor to help the supervisor make fine tunings of the overall system and to enhance the utilization of the supervisor's time. Interface 115 includes an agent performance summary for the morning campaign described in FIG. 3. The interface includes a welcome statement for Tim the agent supervisor and a sign out option presuming that Tim is currently signed in.

A prompt to supervisor Tim informs him that overall the campaign was successful and met or exceeded CC objectives. This may be very important as often CC objectives must be met to ensure renewal or continuation of the contract enabling the center to handle transactions for an enterprise. Another system message 402 informs the supervisor that the campaign utilized the services of 35 agents.

Performance summary data 400 compares agent performance statistics for all of the agents that contributed to the campaign. To be fair the evaluation may only consider the agents that worked the campaign from start to finish. Agent 01, Jake Smith is listed as the first agent of the 35 evaluated. The total # of calls and the total # of emails that each agent processed are listed. A percentage of compliance to system suggestions during the campaign is listed. This percentage value reflects the percentage of compliance that the agent had following all of the system prompts associated with individual transactions. The last value for each agent is the overall performance rating based on some scale established for the purpose.

Other supervisor views showing different data may be ordered and there may be multiple different interface views available to the supervisor without departing from the spirit and scope of the present invention. For example AHT for voice and email transactions might be listed for each agent, Skill levels might be listed for each agent for comparison and handicap consideration. For example if the information for Jake Smith (Agent 01) is the same or very similar to the information for John Smote (Agent 02) and, agent 02 had a much lower skills level that agent 01, then agent 02 (John Smote) might receive mention or most improved agent, or some other benefit. There are many possibilities.

Figure 5:
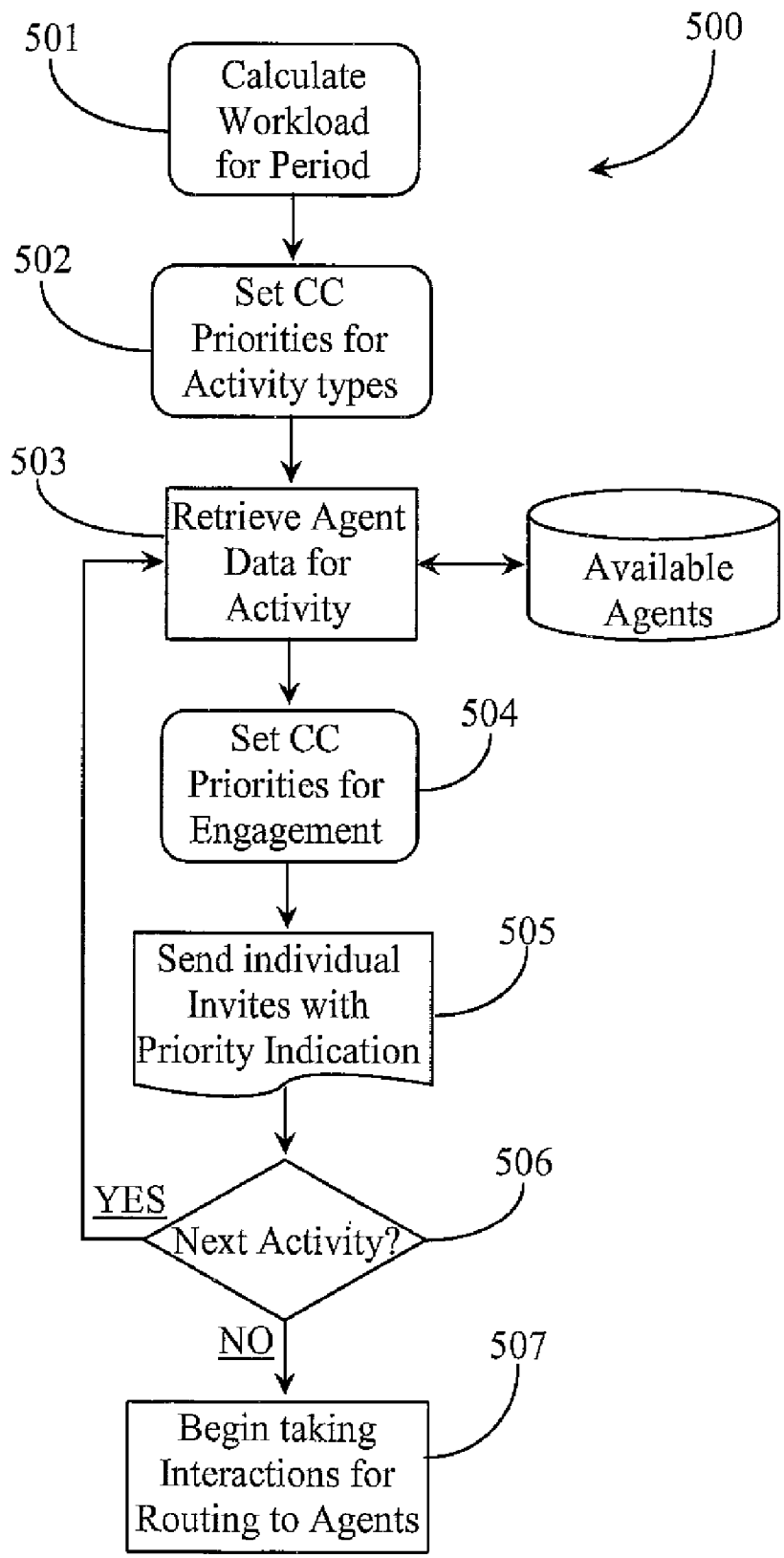
FIG. 5 is a process flow chart illustrating steps for prioritizing activities according to an embodiment of the present invention.

FIG. 5 is a process flow chart 500 illustrating steps for prioritizing call center workload according to an embodiment of the present invention. At step 501, the CC system calculates the projected workload for the CC for a certain period. This step is performed based on past history and other factors. Hopefully the center predictions are substantially accurate. At step 502, the CC system sets priorities for the activities for the period. For example, a morning outbound campaign may be more important to the center than an afternoon cold calling campaign.

At step 503, the system selects a scheduled activity and retrieves agent data for that activity from the available agent database. In this step the CC must predict the number of agents that should be required to handle the workload for that activity. The CC might include skill set types and proficiency thresholds when recruiting or scheduling the agents for the CC activity.

At step 504, the CC might set priorities for agent engagement for the activities. In an embodiment where agents are invited to participate the agents with the most relevant skills and proficiency ratings might get the highest priority indications for joining the activity. If the activity is a sales campaign that requires an agent group that shares a single queue, the bulk of the agent group should be agents that are well suited for the activity. As higher skilled agents are taken and peak period for the activity begins, lower priority invitations previously sent to available agents might be replaced with higher priority invitations to recruit more agents.

At step 505 the CC system sends invitations with priority indications to each agent of the considered agent group. The invitations might include the description of the CC activity, the scheduled start of the activity, and the system priority level for the invited agent to join the activity. A more skilled agent might have a higher priority indication compared with some other agents to join a particular activity while other agents may have higher priority indication than the more skilled agent for joining other CC activities of the day or week.

The CC may schedule agents for the scheduled CC activities one activity at a time and may delay inviting or scheduling additional agents for a next activity until near the end of the first activity. Some activities may be ongoing throughout the work period. At step 506 the system may decide if it is ready to begin scheduling or recruiting agents for a next activity. If at step 506 the system decides to start fulfillment for the next scheduled activity the process may loop back to step 503 in gathering agent data. Fulfillment of agent grouping for the next activity may be started before the previous activity is finished and agents working the previous activity are considered along with idle agents for invitation to participate in the next activity as the system predicts that the occupied agents will be free by the start of the next activity.

If at step 506, if the CC system decides not to initiate a next activity, then the CC might begin taking transactions for the first activity at step 507 if the scheduled start of that activity has arrived. In this step it is noted that individual incoming transactions may be prioritized relative to importance to the CC and taking into account agent skill level or proficiency level before routing to any agents.

Figure 6:
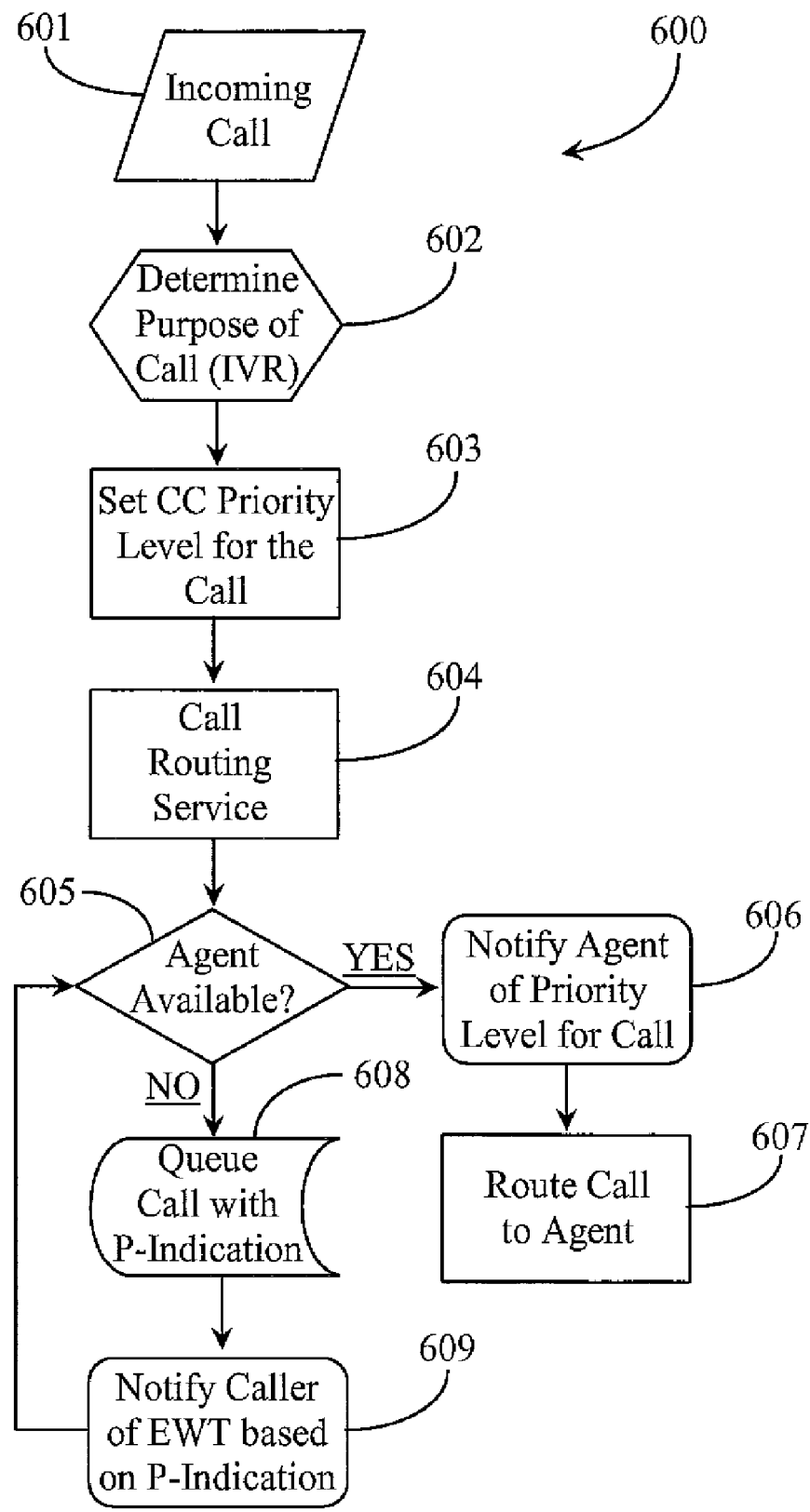
FIG. 6 is a process flow chart illustrating steps for routing transactions in a prioritized workflow environment according to an embodiment of the present invention.

FIG. 6 is a process flow chart 600 illustrating steps for routing transaction in a prioritized workflow environment according to an embodiment of the present invention. This process assumes the transaction activity is servicing incoming voice calls. At step 601 an incoming call arrives at the CC for internal routing. At step 602 the purpose or intent of the caller is determined by IVR. After intent is known, the system may set a priority level for the call at step 603. The priority system may be a simple color bar system showing two or three colors where one is the highest priority and one is the lowest priority. This process assumes that the activity was already scheduled and fulfilled in terms of invited agents. If the call is a sure sale, the priority might be high whereas if the call is an attempt to get a refund or charge back, the priority might be set lower and so on.

At step 604 the CC system calls the routing service to route the transaction. At step 605 the routing system determines if there are any available agents ready to answer transactions. If there is an available agent ready to take the call at step 605, then that agent is notified of the priority level for handling the call at step 606. This priority information may be served along with call data and system suggestions for handling the transaction within the parameters of the priority level for call handling. The parameters may include a limit in the amount of time that might be spent handling the call. At step 607 the call is routed to the agent.

If at step 605 there is no agent immediately available to take the call, then at step 608 the CC system queues the call with the priority indication. At step 609 the IVR may notify the caller of the estimated waiting time in queue based on number of queued calls and the priority indication previously associated with the call. If EWT in queue is X amount of time, then a call with a higher priority indication for handling might have an EWT of X−Y where Y is a static value of time smaller than X. If the priority indication associated with the call is low, then the EWT might be X+Y where Y is a static value smaller than X. The process will continually loop back to step 605 until an agent becomes available for that call, at which time the process for that call may progress on to the thread that includes step 606 and step 607. In this embodiment all of the calls are pre-ranked by the system for call handling with higher priority allowing for more call handling time and lower priority equating to shorter handling time.

Other embodiments are possible without departing from the spirit and scope of the present invention. In one embodiment a visual priority indicator changes with agent involvement with a campaign such that the agent who was a high priority for joining a campaign becomes a low priority for continuing with the same campaign. In this embodiment that agent may receive an invitation to another unrelated campaign where the engagement priority is higher than the priority for staying with the current campaign where the campaigns overlap or are concurrent.

It will be apparent to one with skill in the art that the engagement priority indication system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A call center system, comprising:
   a computerized server executing software (SW) from a machine-readable medium;
   a data collection engine of the SW enabled for collecting data regarding incoming transactions and selected agents, including agent skills;
   a data processing function coupled to the data collection engine and enabled for processing the data collected regarding agents and transactions against a set of business rules, the data processing function determining a priority level for individual ones of the incoming transactions, the priority level being set higher for agents whose skill level better match a transaction, wherein the priority level decreases for the transaction viewed in an agent's interface having skills that are not determined to be best for the transaction; and
   a distribution function enabled for distributing an indication of the priority levels determined by the data processing function associated with individual transactions to two or more presentation interfaces accessible to agents, before the time the associated transactions are engaged by an agent;
   wherein a plurality of priority indications are distributed to a plurality of agents and are displayed simultaneously in each presentation interface and the agents select transactions to engage via the interfaces.

2. The system of claim 1 wherein priority levels are determined for call center tasks to which agents may be assigned or invited as well as for transactions, and wherein priority indicators for such tasks are distributed to associated agents at or near the time that the agents are assigned or invited to engage in the tasks.

3. The system of claim 2 wherein the tasks include one or more of an instruction to engage in text message processing, email processing, order processing, chat hosting and participation in prepared campaigns.

4. The system of claim 3 wherein the data collection engine collects information regarding selected agents and tasks as well as regarding transactions, and the agent and task information is used along with the transaction information in determining priority levels for transactions.

5. The system of claim 1 wherein the information includes workload projection data relevant to each agent.

6. The system of claim 1 wherein the priority indication comprises a display indicating priority level by color.

7. The system of claim 6 wherein the priority indication further comprises one or more specific suggestions formulated by the system and related to the priority indication, to guide the agent that engages an associated transaction.

8. A method for call center management, comprising the steps of:
   (a) collecting data regarding incoming transactions and selected agents, including agent skills, by executing software (SW) from a machine-readable medium by a computerized server;
   (b) processing the data collected regarding agents and transactions against a set of business rules by a data processing function, determining a priority level for individual ones of the incoming transactions, the priority level being set higher for agents whose skill level better match a transaction, wherein the priority level decreases for the transaction viewed in an agent's interface having skills that are not determined to be best for the transaction;
   (c) distributing a priority indication of the priority levels determined by processing the data associated with individual transactions to two or more presentation interfaces accessible to agents, at or near the time the associated transactions are engaged by an agent; and
   (d) displaying a plurality of priority indications simultaneously in each presentation interface, with the associated priority indication, in the one or more interfaces and the agents select transactions to engage via the interfaces.

9. The method of claim 8 wherein the priority indications are distributed to the associated agents before the transactions are engaged by the agents.

10. The method of claim 8 wherein priority levels are determined for call center tasks to which agents may be assigned or invited as well as for transactions, and wherein priority indicators for such tasks are distributed to associated agents at or near the time that the agents are assigned or invited to engage in the tasks.

11. The method of claim 10 wherein the tasks include one or more of text message processing, email processing, order processing, chat hosting and participation in prepared campaigns.

12. The method of claim 11 wherein the data collection engine collects information regarding selected agents and tasks as well as regarding transactions, and the agent and task information is used along with the transaction information in determining priority levels for transactions.

13. The method of claim 8 wherein the information includes workload projection data relevant to each agent.

14. The method of claim 8 wherein the priority indication comprises a display indicating priority level by color.

15. The method of claim 14 wherein the priority indication further comprises one or more specific suggestions formulated by the system and related to the priority indication, to guide the agent that engages an associated transaction.

* * * * *